United States Patent [19]

Lesage

[11] Patent Number: 5,369,156

[45] Date of Patent: Nov. 29, 1994

[54] BLENDING BITUMEN INTO POLYISOBUTYLENE-ETHYLENE/VINYL ACETATE MIXTURE

[75] Inventor: Jean Lesage, Deuil-la-Barre, France

[73] Assignee: The British Petroleum Company plc, London, England

[21] Appl. No.: 197,543

[22] Filed: Feb. 17, 1994

Related U.S. Application Data

[63] Continuation of Ser. No. 987,077, Dec. 7, 1992, abandoned, which is a continuation of Ser. No. 595,744, Oct. 10, 1990, abandoned, which is a continuation of Ser. No. 203,941, Jun. 8, 1988, abandoned.

[51] Int. Cl.$^5$ .................................. C08K 5/01
[52] U.S. Cl. ........................... 524/68; 524/69; 523/351
[58] Field of Search .................. 523/351; 524/69, 70, 524/71, 68

[56] References Cited

U.S. PATENT DOCUMENTS

| | | | |
|---|---|---|---|
| 3,414,533 | 12/1968 | Trieschmann et al. | 524/69 |
| 4,613,632 | 9/1986 | Aliani et al. | 524/77 |
| 4,728,683 | 3/1988 | Smits et al. | 524/69 |

FOREIGN PATENT DOCUMENTS

| | | | |
|---|---|---|---|
| 703594 | 2/1965 | Canada | 524/69 |
| 1342466 | 9/1963 | France . | |
| 1475531 | 3/1967 | France . | |
| 1512974 | 1/1968 | France . | |
| 2130121 | 11/1972 | France . | |
| 2124335 | 11/1972 | Germany . | |
| 53-067221 | 6/1978 | Japan . | |
| 53-133221 | 11/1978 | Japan | 524/69 |
| 377573 | 7/1975 | Sweden . | |
| 1137545 | 12/1968 | United Kingdom . | |
| 1348385 | 3/1974 | United Kingdom . | |

*Primary Examiner*—Robert E. Sellers
*Attorney, Agent, or Firm*—Beveridge, DeGrandi, Weilacher & Young

[57] ABSTRACT

A bitumenous binder useful in road surfacing is prepared via the blending of from 1–35% by weight of bitumen with a mixture of an ethylene/vinyl acetate copolymer and polyisobutylene having a number average molecular weight of greater than 400 to less than 1,000 wherein the ratio of polyisobutylene:ethylene/vinyl acetate is between 90:10 and 50:50.

10 Claims, No Drawings

BLENDING BITUMEN INTO POLYISOBUTYLENE-ETHYLENE/VINYL ACETATE MIXTURE

This application is a continuation of application Ser. No. 07/987,077, filed Dec. 7, 1992, (now abandoned) which is a continuation of application Ser. No. 07/595,744, filed Oct. 10, 1990 (now abandoned), which application is a continuation of application Ser. No. 07/203,941, filed Jun. 8, 1988 (now abandoned). All of above-named applications are entirely incorporated herein by reference.

The invention relates to a process for preparing compositions based on bitumen and polymers intended, in particular, for use as a road surfacing or an impermeable coating.

It is known that polybutenes such as polybutylene and polyisobutylene are compatible with polyethylenes, polyethylene waxes, polyisobutylenes such as those sold under the name VISTANEX, butyl rubbers, regenerated rubbers, butadiene/styrene copolymers (GRS), and petroleum resins such as diene resins.

By combining a polybutene with a copolymer of ethylene and vinyl acetate, and by introducing this mixture, prepared beforehand, into bitumen, it is to boost the consistency and softening properties of the bituminous binder.

The subject of the invention is hence a process for preparing a bitumen/polymer mixture comprising, in a first stage, the preparation of a single additive based on polybutene and an ethylene/vinyl acetate copolymer and the addition of this additive to bitumen. This process is especially advantageous since it suffices simply to mix, for example in a static mixer, the additive with the bitumen, whereas the addition of ethylene/vinyl acetate copolymer or polybutene separately necessitates several hours' mixing using a paddle malaxator, which leads to less homogeneity in the properties of the mixture of bitumen and additive based on polybutene and the ethylene/vinyl acetate copolymer.

Another subject of the invention consists of the additive prepared in the above manner.

The object of the invention is also the production of surfacings or sealings employing the product thereby obtained.

Other subjects of the invention will become apparent on reading the description and the examples which follow.

The process according to the invention consists essentially in adding to a bitumen a mixture, prepared beforehand, comprising an ethylene/vinyl acetate copolymer and a polyisobutylene having a number average molecular weight of between 400 and 1,000.

The composition comprising the mixture of the ethylene/vinyl acetate copolymer and polyisobutylene constitutes another subject of the invention. It is preferably prepared by the gradual addition of granules of ethylene/vinyl acetate copolymer to a liquid polyisobutylene at a temperature slightly above the temperature of dissolution of the ethylene/vinyl acetate copolymer, by mixing in a slow paddle malaxator or injection by pump and stirring.

The ethylene/vinyl acetate copolymer is preferably a copolymer containing 5 to 45% by weight of vinyl acetate units, and preferably a proportion smaller than 20%, and a melt flow index of between 0.1 and 600, and preferably between 100 and 200. The polyisobutylene preferably has a number average molecular weight of less than 1,000 and greater than 400. The mixing of polymers is performed in ratios of polyisobutylene to ethylene/vinyl acetate of between 90:10 and 50:50, and preferably of the order of 80:20.

The bitumen is preferably a blown or direct road bitumen, which is well known in the prior art.

The composition based on the mixture of polymers is added to this bitumen, preferably in proportions of 1 to 35% with respect to the total weight of the composition, and preferably in proportions from 5 to 30%.

It is possible to prepare a bituminous binder directly on site, by mixing the composition based on polymers, as defined above, and bitumen in times of less than ¼ hour, with, for example, a paddle malaxator, or almost immediately with a static mixer.

The addition of the composition containing the mixture of polymers, as defined above, enables a synergistic effect to be obtained as a result of an increase in the softening point and a parallel lowering of the low-temperature breaking point. Thus, as a result of the combination, it is possible to improve the plastic range and the penetration index. This is especially surprising in the light of the properties of the separate polymers.

Another advantage of the invention is that the composition based on the mixture of polymers, designed to be added to bitumen, may be stored without any problem for a long period without degradation and with retention of the initial viscosity.

The road surfacings thus produced behave particularly well in strong heat; the Applicant has, in effect, found that the binder retains sufficient consistency and viscosity to prevent any irreversible deformation due to flow of the surfacing, in particular under the action of heavy traffic.

Moreover, in cold weather, the binder thus applied displays resistance to cracking in the cold, which enables the surfacing to withstand winter stresses such as the use of spiked tyres. The bituminous binders prepared in this manner possess, moreover, exceptional properties of elasticity, tenacity and adhesiveness to the aggregates.

The examples which follow are designed to illustrate the invention without, however, being limiting in nature,

EXAMPLE 1

23 parts of an ethylene/vinyl acetate copolymer, having a vinyl acetate content of 18% and a melt flow index of 140, and 77 parts of a polyisobutylene having a number average molecular weight of 900 are mixed at a temperature of 140° C. in a paddle malaxator, the ethylene/vinyl acetate copolymer being introduced in the form of granules. With 3 kg of polymers at 300 rpm, fusion of the ethylene/vinyl acetate granules in the polyisobutylene is obtained in less than ¼ hour.

Keeping this polymer mixture for 15 days at a temperature of 135° C. shows that the mixture is completely stable and retains its initial viscosity. No settling is observed.

This mixture is added to road bitumen (40/50) in proportions of 30% of the polymer mixture with respect to the total weight of the composition. The polymer/bitumen mixture is produced in less than ¼ hour by means of a paddle malaxator.

EXAMPLE 2 comparative

2% of ethylene/vinyl acetate copolymer containing 18% of vinyl acetate and having a melt flow index of 140 is added to a grade 40/50 bitumen (penetrability 41, softening point 56, Fraass point −9° C., penetration index +0.46). The softening point is brought to 60.5° C. and the penetration index to 0.85 without the Fraass point being modified. The plastic range has risen from 65° to 69.5° C.

The addition of 5% of polyisobutylene of number average molecular weight 900 to the same bitumen does not modify the softening point, lowers the Fraass point to −16° C. and brings the penetration index to +0.5 and the plastic range to 72° C.

The addition to the same bitumen of a composition as defined in Example 1, based on ethylene/vinyl acetate copolymer and polyisobutylene and containing 28% of ethylene/vinyl acetate copolymer and 72% of polyisobutylene, this composition being added in the proportion of to the bitumen composition, brings the softening point to 58° C., the Fraass point to −17° C., the penetration index to +1.2 and the plastic range to 75° C.

The addition of the composition hence makes it possible to improve the bituminous binder in respect of all these properties, without increasing its service stresses.

EXAMPLE 3

A formulation is prepared containing 10 parts of polyisobutylene having a number average molecular weight of 900 and 3 parts of ethylene/vinyl acetate copolymer having a vinyl acetate content of 18% and a melt flow index of 140, and this is introduced into 87 parts of 40/50 bitumen as defined above.

The following viscosities are observed:

at 140° C.: 722 mPa.s; at 160° C.: 297 mPa.s; at 180° C.: 142 mPa,s; whereas the base bitumen has the following viscosities:

at 140° C.: 600 mPa.s; at 160° C.: 263 mPa.s; at 180° C.: 1 42 mPa.s.

It is found that the combination according to the invention enables the viscosity when hot to be increased slightly, and also improves the ease of handling of the mix. This is observed in the Laboratoire des Ponts de Chaussées rotary shearing press test, on a discontinuous 0/14 mix of formula:

10/14 porphyry: 26%
6/10 porphyry: 31%
0/2 porphyry: 39 %
calcareous fines: 4%
binder content: 7.7 (parts by weight per hundred parts of aggregates).

The 0/14 mix with the polymer binder according to the invention achieves
89.5 compactness at 10 rotations
92.0 compactness at 20 rotations
95.0 compactness at 50 rotations.

The binder prepared in this manner possesses, moreover, properties of resistance in the fatigue test and of resistance to stripping by water or adhesiveness which are also improved.

A fatigue test is performed, according to the LCPC (Laboratoire Central des Ponts et Chaussées) method in sinusoidal bending to constant deformation of trapezoid test pieces, the test being performed using plates of mixes manufactured and compacted according to the Laboratoire des Ponts et Chaussées procedures, on the mixes of the following formula:
6/10 La Noubleau 33%
2/6.3 La Noubleau 24%
0/2 La Noubleau 40.7%
calcareous filler: 2.3%
binder 5.75 pph, The following figures are obtained at a frequency of 25 hertz and at 10° C.:

at $10^6$ cycles, the relative deformation is:
$1.40 \times 10^{-4}$ for the reference mix (40/50 binder), but
$2.20 \times 10^{-4}$ for the mix with the bitumen/polymer binder defined above.

at $10^5$ cycles, the relative deformation is:
$2 \times 10^{-4}$ for the reference mix; and
$3 \times 10^{-4}$ for the mix with the bitumen/polymer binder.

It is hence observed that there is a larger permissible deformation for the same fatigue test time for the mix containing the polymer binder according to the invention. In the water stripping test, this property is demonstrated by the ratio of the resistances at 18° C. in the DURIEZ (or LCPC) unconfined compression test, with retention on immersion in water for 7 days with respect to the concentration in the dry state also for 7 days.

Taking the following mix formula:
10/14 La Noubleau 69%
0/2 La Noubleau 27.5%
calcareous filler: 3.5%
binder content 5.5 pph the ratio of the resistances is 0.88 for the 40/50 reference mix, compared with 0.96 for the mix with the bitumen/polymer binder as defined above.

I claim:

1. Process for preparing a bituminous binder which comprises: mixing with a bitumen, 1 to 35% by weight, based on the total weight of the mixture, of a beforehand prepared composition of an ethylene/vinyl acetate copolymer and a polyisobutylene having a number average molecular weight of greater than 400 or less than 1,000, wherein the ratio of polyisobutylene to ethylene/vinyl acetate is between 90:10 and 50:50.

2. Process according to claim 1 in which the ethylene/vinyl acetate copolymer is a copolymer containing 5 to 45% by weight of vinyl acetate units and having a melt flow index of 0.1 to 600.

3. Process according to claim 1 which is carried out at the site of use, the mixing time not exceeding ¼ hour.

4. Process for preparing a bituminous binder as defined in claim 1, further comprising gradually adding granules of the ethylene/vinyl acetate copolymer to the polyisobutylene at a temperature slightly above the temperature of dissolution of the ethylene/vinyl acetate copolymer in the liquid polyisobutylene and mixing.

5. The process according to claim 1, wherein the ethylene/vinyl acetate copolymer contains 5 to 45% by weight vinyl acetate.

6. The process according to claim 5, wherein the ethylene/vinyl acetate copolymer contains less than 20% by weight vinyl acetate.

7. The process according to claim 1, wherein the ethylene/vinyl acetate copolymer has a melt flow index between 0.1 and 600.

8. The process according to claim 7, wherein the melt flow index is between 100 and 200.

9. The process according to claim 1, wherein the ratio of polyisobutylene to ethylene/vinyl acetate is about 80:20.

10. The process according to claim 9, wherein the beforehand prepared composition of ethylene/vinyl acetate copolymer and polyisobutylene may be stored for at least 15 days and 135° C. without becoming unstable, losing viscosity or settling.

* * * * *